W. A. MACK.
SHANK BURNISHERS FOR BOOTS AND SHOES.
No. 179,120. Patented June 27, 1876.
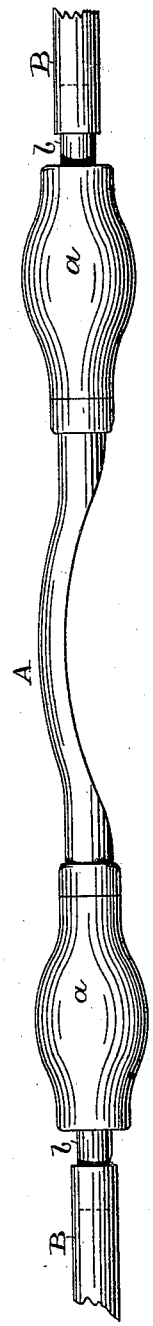
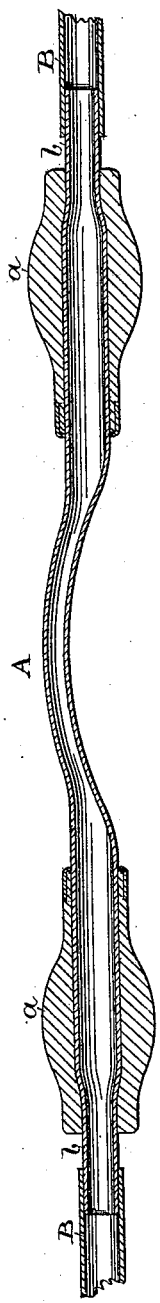

UNITED STATES PATENT OFFICE.

WILLIAM A. MACK, OF NORWALK, OHIO.

IMPROVEMENT IN SHANK-BURNISHERS FOR BOOTS AND SHOES.

Specification forming part of Letters Patent No. 179,120, dated June 27, 1876; application filed February 14, 1876.

*To all whom it may concern:*

Be it known that I, WILLIAM A. MACK, of Norwalk, in the county of Huron and State of Ohio, have invented certain new and useful Improvements in Shank-Burnishers; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My invention relates to shank-burnishers or tools used for burnishing or polishing boots and shoes.

Heretofore the tools of this description used for hand-burnishing have been constructed of a solid metal bar bent into the required form, and provided with handles at each end, and such tools have heretofore been heated by lamps or over coal or wood fires.

My invention consists in making this description of hand-burnisher hollow or tubular throughout its length, and connecting its ends with elastic tubing, through which steam or heated fluids are made to circulate, for the purpose of heating the tool, and thereby facilitating the operation of burnishing, the tool being always hot and ready for use.

In the accompanying drawings, Figure 1 is a view of my improved burnisher. Fig. 2 is a sectional view of the same.

Referring to the parts by letters, A represents a hand-burnisher, made of metal, of the usual form, and having handles $a\ a$, for convenience of operation. These handles may be made of wood, or of any suitable material, preferably a material which is a poor conductor of heat.

The metal portion of the tool is made tubular or hollow throughout its length, as clearly shown by Fig. 2 of the drawings, and its ends $b\ b$ project beyond the handles $a\ a$, for the purpose of being connected with elastic tubing $B\ B$, through which steam or any suitable heated liquid is made to circulate in any known manner, as by having the tubes connected with pipes which are connected at one or both ends with a steam-boiler, or connecting with and forming part of a continuous pipe filled with water or other fluid, a portion of which is coiled within a stove or other heater, so that a continuous circulation of the heated fluid is maintained.

A tool of this description, connected with elastic tubing, as described, is ready at all times, and may be picked up from the bench and used when required, and after being used may be placed on the bench or work-table, or hung up, until again required for use, without previous adjustment or preparation. It may also be used as an ordinary burnisher, the fact of its being hollow and capable of being heated, in the manner described, in no way interfering with its use.

Having thus described my invention, what I claim as new, and desire to secure by Letters Patent, is—

1. A hand-burnisher made hollow or tubular, as described, so that it may be heated, in the manner substantially as and for the purpose specified.

2. The hollow hand-burnisher A, having projecting ends $b\ b$, in combination with elastic tubing $B\ B$, adapted to heat the burnisher, substantially as and for the purpose specified.

In testimony that I claim the foregoing as my own I affix my signature in presence of two witnesses.

WILLIAM A. MACK.

Witnesses:
 ALVIN B. GRIFFIN,
 J. C. CURTISS, Jr.